US00RE33815E

United States Patent [19]

Yamaguchi et al.

[11] E Patent Number: Re. 33,815

[45] Reissued Date of Patent: Feb. 4, 1992

[54] HEAT SENSITIVE RECORD SHEET

[75] Inventors: Masahiko Yamaguchi; Michihiro Gonda; Yutaka Satoh; Mikiko Kanasugi, all of Tokyo, Japan

[73] Assignee: Hodogaya Chemical Co., Ltd., Tokyo, Japan

[21] Appl. No.: 212,327

[22] Filed: Jun. 27, 1988

Related U.S. Patent Documents

Reissue of:

[64] Patent No.: 4,510,513
Issued: Apr. 9, 1985
Appl. No.: 513,344
Filed: Jul. 13, 1983

[30] Foreign Application Priority Data

Apr. 14, 1983 [JP] Japan ..... 58-64569

[51] Int. Cl.[5] ..... B41M 5/30

[52] U.S. Cl. ..... 503/214; 427/151; 503/216; 503/217; 503/221; 503/225

[58] Field of Search ..... 427/151; 428/913, 914; 503/216, 217, 221, 225, 214

[56] References Cited

U.S. PATENT DOCUMENTS

| | | | |
|---|---|---|---|
| 3,746,562 | 7/1973 | Lin | 346/221 |
| 3,920,510 | 11/1975 | Hatano et al. | 346/221 |
| 4,400,437 | 8/1983 | Oeda | 428/447 |
| 4,544,936 | 10/1985 | Yokoi | 503/209 |
| 4,695,640 | 9/1987 | Yahagi et al. | 549/226 |
| 4,727,162 | 2/1988 | Yahagi et al. | 549/226 |

FOREIGN PATENT DOCUMENTS

| | | | |
|---|---|---|---|
| 0048026 | 9/1981 | European Pat. Off. | 503/221 |
| 54-7815 | 4/1979 | Japan | 503/221 |
| 55-69159 | 5/1980 | Japan | 503/221 |
| 116685 | 7/1982 | Japan | 346/221 |
| 57-78592 | 11/1982 | Japan | 503/221 |
| 178792 | 11/1982 | Japan | 346/221 |
| 57-193387 | 11/1982 | Japan | 503/221 |
| 58-90812 | 12/1983 | Japan | 503/221 |
| 60-56139 | 10/1985 | Japan | 503/221 |
| 62-8719 | 7/1987 | Japan | 503/221 |
| 2102135A | 4/1982 | United Kingdom | 503/200 |

OTHER PUBLICATIONS

1983 Coating Conference: San Francisco Hilton & Towers, San Francisco, Calif., May 15–18; "Dyes and Chemicals for Carbonless Copying Paper: History, Present Situation, Problems and Trends" by J. C. Petitpierre.

*Primary Examiner*—Bruce H. Hess
*Attorney, Agent, or Firm*—Oblon, Spivak, McClelland, Maier & Neustadt

[57] ABSTRACT

A heat sensitive record sheet which comprises a coated layer comprising 2-anilino-3-methyl-6-dibutylamino-fluoran.

7 Claims, No Drawings

HEAT SENSITIVE RECORD SHEET

Matter enclosed in heavy brackets [ ] appears in the original patent but forms no part of this reissue specification; matter printed in italics indicates the additions made by reissue.

The present invention relates to a heat sensitive record sheet. More particularly, it relates to a heat sensitive record sheet having a coated layer comprising 2-anilino-3-methyl-6-dibutylaminofluoran as a fluoran compound useful as a color precursor.

Certain fluoran compounds have been disclosed in U.S. Pat. Nos. 3,746,562 and 3,920,510. These fluoran compounds are used as color precursors for heat sensitive record sheets or electrical heat sensitive record sheets. However, heat sensitive record sheets wherein these fluoran compounds are used as color precursors, have various drawbacks in the developed color density, the initial color density, the color-development initiation temperature, the rising for color-development and the temperature required to obtain a color density of 1.0. Therefore, they can not provide adequate properties required for heat sensitive record sheets, particularly heat sensitive record sheets for high speed printing. For instance, 2-anilino-3-methyl-6-diethylaminofluoran disclosed in the above U.S. Patents, tends to undergo color development during the preparation of heat sensitive record sheets, whereby the initial color density of the record sheets tends to be high and the rising for the color development is inadequate. On the other hand, with a heat sensitive record sheet wherein 2-(2-chlorophenyl amino)-6-diethylamino-fluoran is used, the initial color density is low, but the color-development initiation temperature is too high and the rising for the color development is inadequate. Thus, the compounds disclosed in the above-mentioned U.S. Patents have shortcomings one way or another, and no compounds which is capable of fully satisfying various properties required for heat sensitive record sheets, such as the developed color density, the initial color density, the color-development initiation temperature, the sharp rising for color-development and the low temperature required to obtain a color density of 1.0, has been found.

The rising for color-development means a rising of a curve in a diagram of color density-color-development temperature curve given by plotting color densities on the ordinate and color-development temperatures on the abscissas as a value given by multiplying 100 to tan $\theta$ in the maximum slant of the curve.

It is an object of the present invention to provide a heat sensitive record sheet which has no substantial self-color development, a high developed color density, a low color-development initiation temperature, a high rising for color-development and a low temperature required to obtain a color density of 1.0.

The above object has been attained by providing a heat sensitive record sheet which comprises a coated layer comprising 2-anilino-3-methyl-6-dibutylaminofluoran. Its has been found that the specific fluoran compound used in the present invention provides adequate properties with respect to the above-mentioned desired properties, and that it provides a particularly excellent rising for color-development and a characteristic of providing a color density of 1.0 at a low temperature, which are required for high speed printing.

Now, the present invention will be described in detail with reference to the preferred embodiments.

The specific fluoran compound used in the present invention is a cololess or slightly colored solid which is stable in air and which, when brought in contact with an acidic substance, immediately forms a coloring agent having a dark black color. This developed coloring agent has excellent storage stability and is therefore quite useful.

Now, there will be given a process for producing 2-anilino-3-methyl-6-dibutylaminofluoran to be used in the present invention and an Example of the present invention.

Preparation of 2-anilino-3-methyl-6-dibutylaminofluoran

(Compound No. 1)

To 70 g of 95% sulfuric acid, 8.86 g of 2-(2-hydroxy-4-dibutylaminobenzoyl)benzoic acid was added and completely dissolved at a temperature of about 20° C., and then 4.27 g of 2-methyl-4-methoxy-diphenylamine was added and reacted therewith at a temperature of from 10° to 70° C. for from 2 to 48 hours. After the reaction, the reaction mixture was poured into 200 ml of ice water, and the precipitates were collected by filtration. To the cake thereby obtained, 300 ml of toluene and a 10% sodium hydroxide aqueous solution were added, and the mixture was stirred for 2 hours under reflux. Then, the toluene layer was separated by liquid separation, and washed with water, and then 1.0 g of active carbon was added thereto and filtered. The toluene layer was concentrated for crystallization, whereby 5.44 g of white crystals were obtained. The melting point of this product was from 145° to 148° C. Further, this product had $\nu_{max}$ of 450 nm ($1.88\times10^4$) and a molecular extinction coefficient of 595 nm ($195\times10^4$) as measured in 95% acetic acid. A solution of this product in toluene was colorless. When brought in contact with silica gel, the product readily underwent color-development and turned black. With a clay paper, it formed a violet black color, and with a resin paper, it formed a black color.

Now, a general process for preparing the heat sensitive record sheet using the specific fluoran compound of the present invention will be described.

The fluoran compound, an acidic substance and, if necessary, a heat-melting substance (which is used when the fluoran compound or the acidic substance does not melt at the desired temperature) are finely pulverized and mixed with a binder solution or dispersion which has been prepared by dissolving or dispersing a binder in a solvent or dispersing medium. The coating mixture thereby obtained is applied onto a support such as a sheet of paper, a plastic sheet or a resin-coated paper sheet, and then dried to obtain a heat sensitive record sheet.

For the preparation of the coating mixture, the components may be pulverized independently or in a proper combination prior to mixing together, or all together after they are put together.

The coating mixture preferably comprises 1 part by weight of the fluoran compound, from 2 to 10 parts by weight of the acid substance, from 0 to 10 parts by weight of the heat-melting substance, from 2 to 10 parts by weight of the binder, and from 30 to 150 parts by weight of the solvent or dispersing medium.

The solvent or dispersing medium is preferably the one which does not substantially dissolve the fluoran compound and the acidic substance. As such a solvent or dispersing medium, water is most preferred, and a hydrocarbon such as hexane or ligroin is also useful.

As the binder to be used in the present invention, there may be mentioned polyvinyl alcohol, methyl cellulose, hydroxyethyl cellulose, carboxymethyl cellulose, gum arabic, a synthetic rubber, polyvinyl pyrolidone, a styrene-maleic anhydride copolymer or polyacrylic acid amide. Particularly preferred are water-soluble binders such as polyvinyl alcohol, polyvinyl pyrolidone, hydroxymethyl cellulose and gum arabic.

Typical acidic substances include phenolic compounds disclosed in British Patent Specification 1,135,540 or colorless solid organic acids such as stearic acid, benzoic acid, gallic acid, and salicylic acid which are liquefied or vaporized at a temperature of 50° C. of higher or their metal salts such as aluminum or zinc salts. Particularly preferred acidic substances are the phenolic compounds, and a typical example is 4,4'-isopropylidene-diphenol (bisphenol A).

As the heat-melting substance, there may be used stearic acid amide, oleic acid amide, ethylene-bis-stearoamide, benzoin, p-t-butylphenol, p-phenylphenol, p-hydroxy methylbenzoate, diphenylphthalate or p-hydroxydiphenyl ether.

EXAMPLE

To 2.0 g of Compound No. 1 prepared in the above Preparation Example, 20 g of water and 20 g of an aqueous solution containing 10% by weight of polyvinyl alcohol were added. The mixture was thoroughly dispersed and mixed in a ball mill at room temperature for 24 hours, whereby a colorless slurry was obtained wherein the particle size of the compound was about 3 μm. On the other hand, 7 g of bisphenol A was added to 10 g of water and 40 g of an aqueous solution containing 10% by weight of polyvinyl alcohol. The mixture was thoroughly dispersed and mixed in a ball mill at room temperature for 24 hours, whereby a slurry was obtained. The solid substance in this slurry had an average particle size of about 5 μm. Both slurries were mixed, and the mixture was uniformly dispersed and mixed at room temperature for 1 hour, whereby a slurry mixture was prepared. This slurry mixture was coated on one surface of a normal paper of 50 g/m² by means of a wire bar coater (wound wire: 0.35 mm in diameter) in an amount of the coated compound being 1.5 g per 1 m² of the paper. The coated paper was dried in air at room temperature, whereby a heat sensitive record sheet having a substantially colorless heat sensitive layer was obtained. The heat sensitive record sheet thus obtained will be referred to as No. A.

For the purpose of comparison, heat sensitive record sheets No. B and C were prepared with use of known 2-anilino-3-methyl-6-diethylaminofluoran (Compound No. 2) and 2-(2-chlorophenylamino)-6-diethylaminofluoran (Compound No. 3). These heat sensitive record sheets were subjected to the following tests.

(1) Color-development performance test

Heat sensitive record sheet No. A and comparative sheets No. B and No. C were heated at a temperature of 150° C. for 5 seconds, whereby the developed color hue, the developed color density and the initial color density were measured by means of Macbeth reflex densitometer RD-514 model with a black filter (Wratten #106).

(2) Color-development characteristic test

Heat sensitive record sheet No. A and comparative sheets No. B and No. C were heated for color-development within the temperature range of from 70° to 160° C. for 5 seconds, whereby the color density at each temperature was measured in the same manner as in the above test (1), and the color-development initiation temperature, the rising for the color-development and the temperature required to obtain a color density of 1.0 were calculated from the relationship between the temperature and the color density.

The results of the above-mentioned color-development performance test (1) and the results of the measurement of the color-development values (2) are shown in the following Table.

Color-development performance and color-development characteristic values of heat sensitive record sheets

| | Heat sensitive record sheets | | Color-development performance | | | Color-development characteristic values | | |
|---|---|---|---|---|---|---|---|---|
| | Compound No. | Sheet No. | Developed color hue | Developed color density | Initial color density | Color-development initiation temp. | Rising for color-development | Temp. required to obtain a color density of 1.0 |
| Present Invention | 1 | A | Black | 1.19 | 0.06 | 94° C. | 11.0 | 115° C. |
| Comparative Examples | 2 | B | Reddish black | 1.12 | 0.12 | 85° C. | 1.2 | 130° C. |
| | 3 | C | Reddish black | 1.06 | 0.06 | 125° C. | 2.7 | 141.5° C. |

Note:
The color development by heating was conducted by means of Iodiacera model thermotest rhodiacerta (manufactured by French National Fiber Research Institute) at a heating temperature of from 70 to 160° C. for a heating time of 5 seconds under a load of 100 g/cm².

It is evident from the results shown in the above Table that the heat sensitive record sheet using the specific fluoran compound of the present invention is far superior to the heat sensitive recording sheets using the comparative fluoran compounds, in the color-development performance and the color-development characteristics. Particularly, the heat sensitive record sheet of the present invention is extremely superior in the high rising for the color development and the low temperature required to obtain a color density of 1.0, which are required for high speed printing. Thus, the industrial value for practical application of the present invention is considerably high.

We claim:

1. A heat sensitive record sheet which comprises a substrate having a coated layer comprising 2-anilino-3-methyl-6-dibutylaminofluoran *having $\nu_{max}$ at about 450 nm and about 595 nm as measured in 95% acetic acid.*

2. The heat sensitive record sheet according to claim 1, wherein the coated layer comprises 1 part by weight of 2-anilino-3-methyl-6-dibutylaminofluoran *having $\nu_{max}$ at about 450 nm and about 595 nm as measured in 95% acetic acid,*, from 2 to 10 parts by weight of an acidic substance and from 2 to 10 parts by weight of a binder.

3. The heat sensitive record sheet according to claim 2, wherein the binder is selected from the group consisting of polyvinyl alcohol, polyvinyl pyrolidone, hydroxymethyl cellulose and gum arabic.

4. The heat sensitive record sheet according to claim 2, wherein the acidic substance is selected from the group consisting of bisphenol A, stearic acid, benzoic acid, gallic acid and salicylic acid.

*5. A heat sensitive record sheet which comprises a substrate having a coated layer comprising 2-anilino-3-methyl-6-dibutylaminofluoran obtained by reacting 2-(2-hydroxy-4-dibutylaminobenzoyl)benzoic acid with 2-methyl-4-methoxy-diphenylamine.*

*6. The heat sensitive record sheet of claim 5 wherein the coated layer comprises one part by weight of 2-anilino-3-methyl-6-dibutylaminofluoran obtained by reacting 2-(hydroxy-4-dibutylaminobenzoyl)benzoic acid with 2-methyl-4-methoxy-diphenylamine, from 2 to 10 parts by weight of an acidic substance and from 2 to 10 parts by weight of a binder.*

*7. The heat sensitive record sheet which comprises a substrate having a coated layer comprising 2-anilino-3-methyl-6-dibutylaminofluoran characterized by having the property of generating a color density of 1.0 at a temperature of about 115° C.*

* * * * *

UNITED STATES PATENT AND TRADEMARK OFFICE
CERTIFICATE OF CORRECTION

PATENT NO. : RE 33,815

DATED : FEBRUARY 4, 1992

INVENTOR(S) : MASAHIKO YAMAGUCHI ET AL

It is certified that error appears in the above-identified patent and that said Letters Patent is hereby corrected as shown below:

Column 4, Claim 1, line 3, correct "$\nu_{max}$" to read --$\lambda_{max}$--;

Column 5, Claim 2, line 4, correct "$\nu_{max}$" to read --$\lambda_{max}$--;

Column 2, line 36, correct "$\nu_{max}$" to read --$\lambda_{max}$--; and

Column 2, line 37, correct" (195 x$10^4$) " to read -- (1.95 x $10^4$)--.

Signed and Sealed this

First Day of June, 1993

*Attest:*

Michael K. Kirk

MICHAEL K. KIRK

*Attesting Officer*

*Acting Commissioner of Patents and Trademarks*